United States Patent [19]

Danielson

[11] Patent Number: 5,315,158
[45] Date of Patent: May 24, 1994

[54] INTEGRATED ROLL CONTROL AND POWER SUPPLY SYSTEM AND METHOD

[76] Inventor: Arnold O. Danielson, P.O. Box 1322, Inyokern, Calif. 93527

[21] Appl. No.: 63,225
[22] Filed: May 17, 1993
[51] Int. Cl.⁵ .............................................. B64G 1/28
[52] U.S. Cl. .................... 290/1 R; 244/3.1; 244/165
[58] Field of Search ............. 290/1 R, 14, 52, 54; 244/3.1, 3.21, 3.23, 164, 165

[56] References Cited

U.S. PATENT DOCUMENTS

| | | | |
|---|---|---|---|
| 3,591,108 | 7/1971 | Perkel et al. | 244/3.21 |
| 3,767,139 | 10/1973 | Fischell | 244/3.21 |
| 3,937,144 | 2/1976 | Daniels | 244/3.1 |
| 4,188,666 | 2/1980 | Legrand et al. | 244/164 |
| 4,688,746 | 8/1987 | Cooper | 244/164 |
| 4,723,735 | 2/1988 | Eisenhaure et al. | 244/165 |

OTHER PUBLICATIONS

Scientific American Article "Flywheels" by Richard F. Post and Stephen F. Post From the December 1973, vol. 229 No. 6 Issue, p. 17 through 23.

*Primary Examiner*—A. D. Pellinen
*Assistant Examiner*—Robert Lloyd Hoover
*Attorney, Agent, or Firm*—Robert J. Hampsch; Melvin J. Sliwka; John Forrest

[57] ABSTRACT

An integrated roll control and power supply system for a missile includes a pair of flywheel-motor-generator (FMG) units, a pair of power flow control (PFC) units coupled between the FMG units and a missile load, and a roll sensor coupled to the PFC units. The integrated system also includes a pair of resistance heaters and a pair of clutch-brake devices. The FMG units are axially aligned and displaced from one another. One FMG unit operates in a counterclockwise direction, while the other FMG unit operates in a clockwise direction. The two FMG units produce the bi-directional roll torque characteristic necessary to develop roll-dampening torques for the missile system roll control autopilot. The PFC units receive roll attitude, rate and acceleration input signals from the roll sensor and, in response to such signals, are operable at three different levels of roll damping to dissipate power flow from the FMG units to supply electrical components of the missile and to operate resistance heaters and clutch/brake devices to develop appropriately balanced roll torques in the missile airframe.

16 Claims, 3 Drawing Sheets

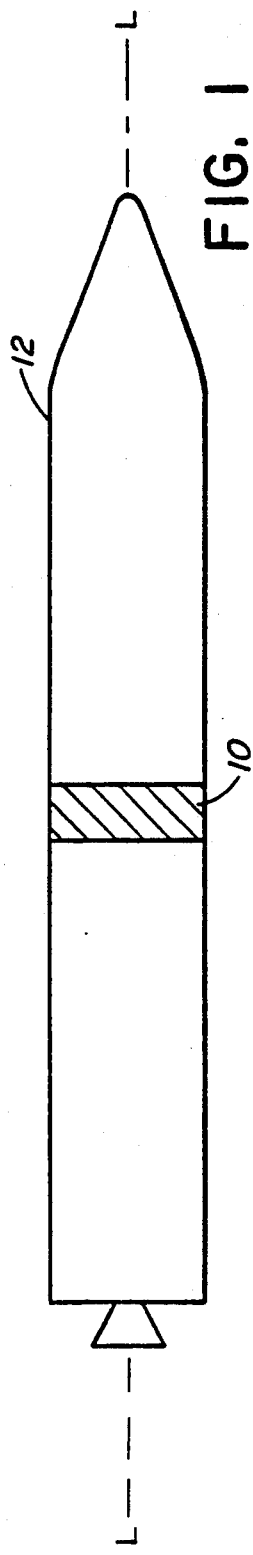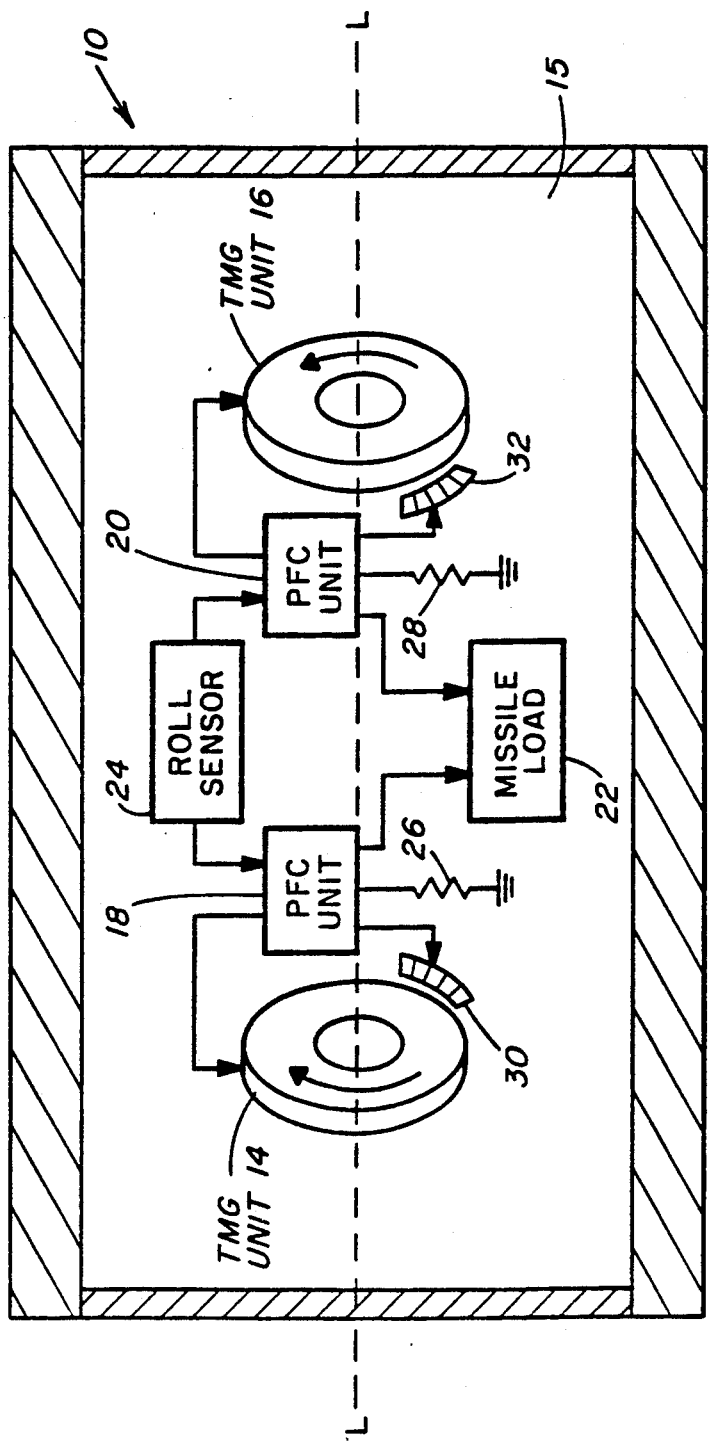

INTEGRATED ROLL CONTROL AND POWER SUPPLY SYSTEM AND METHOD

BACKGROUND OF THE INVENTION

The present invention generally relates to flywheel-motor-generator technology and, more particularly, is concerned with an integrated roll control and power supply system and method for a missile.

Electric energy storage and generation provided through the employment of flywheel-motor-generator technology is well-known in the prior art. A detailed discussion of this approach is provided in an article entitled "Flywheels" appearing in *Scientific American*, December 1973, pages 17–23.

Important advantages of this technology are its high degree of reliability, almost infinite shelf life, little or no sensitivity to cold temperature, inherent built-in test feature, and inherent flexibility and adaptability in that its spin can be increased without increase in size. These advantages make it worthwhile for designers to consider flywheel-motor-generator technology as a potential candidate for providing both stability control and electrical power supply in various applications where space is limited, such as on different platforms used in airborne, space, and undersea environments.

One such airborne application is tactical missiles which typically have severe space limitations and, at the same time, tend to require mission adaptive power sources. It was perceived by the inventor herein that application of this technology could lead to an improved system in which weight and volume requirements are minimized while roll damping is advantageously provided and mission adaptive electrical power is supplied.

SUMMARY OF THE INVENTION

The present invention provides such an improved system in the form of an integrated roll control and power supply system and method for a missile. The integrated roll control and power supply system will hereinafter for the sake of brevity be referred to as the "integrated system". The basic concept underlying the present invention is the provision of an inertial energy storage system configured uniquely to supply power and to dampen roll (supply torque in opposition to externally induced torque) in a bi-directional manner thus to stabilize, reduce, or eliminate undesirable airframe roll. The integrated system provides the combining of inertial energy storage, electric power generation and bi-directional roll torque generation into one package. The integrated system employs a pair of flywheel-motor-generator units to provide both weapon power and roll damping in response to suitable roll autopilot input signals.

The integrated system of the present invention will store energy in a mechanical flywheel and controllably release the energy. The energy is released both in an electrical form to power various components and subsystems of the missile and in a mechanical torque to counteract and dampen unwanted weapon roll excursions or, in other words, to counteract roll torques imposed upon a missile by external forces. The integrated system is serviceable, reusable, and upgradable as a power unit and offers space and weight savings by combining power and control features into a flywheel-motor-generator unit.

Accordingly, the present invention is directed to an integrated roll control and power supply system for a missile which comprises a pair of flywheel-motor-generator (FMG) units, a pair of power flow control (PFC) units coupled between the FMG units and a missile electrical load, and a roll sensor coupled to the PFC units. The integrated system also includes a pair of resistance heaters and a pair of clutch-brake devices.

The FMG units are axially displaced from one another. One FMG unit, such as the forward one, operates in a counterclockwise direction, while the other FMG unit operates in a clockwise direction. The two FMG units must be employed to derive the bi-directional roll torque characteristic necessary to develop roll-dampening torques for the missile system roll control autopilot.

The PFC units receive roll attitude, rate and acceleration input signals from the roll sensor. In response to such signals, the PFC units are operable at different levels. At level one, the PFC units apportion electrical power from either one or both of the FMG units to electrical components of the missile or between the FMG units to develop appropriately balanced roll torques in the missile airframe. At level two, the PFC units switch power flow to the resistance heaters when needed and in proportion to demand for roll counter torque on the airframe. At level three, the PFC units switch additional power flow into the clutch/brake devices in proportion to the need for roll dampening torque.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a general illustration of the integrated roll control and power supply system of the present invention in a missile.

FIG. 2 is a detailed diagram of the integrated roll control and power supply system.

DETAILED DESCRIPTION OF THE INVENTION

Figure 3:
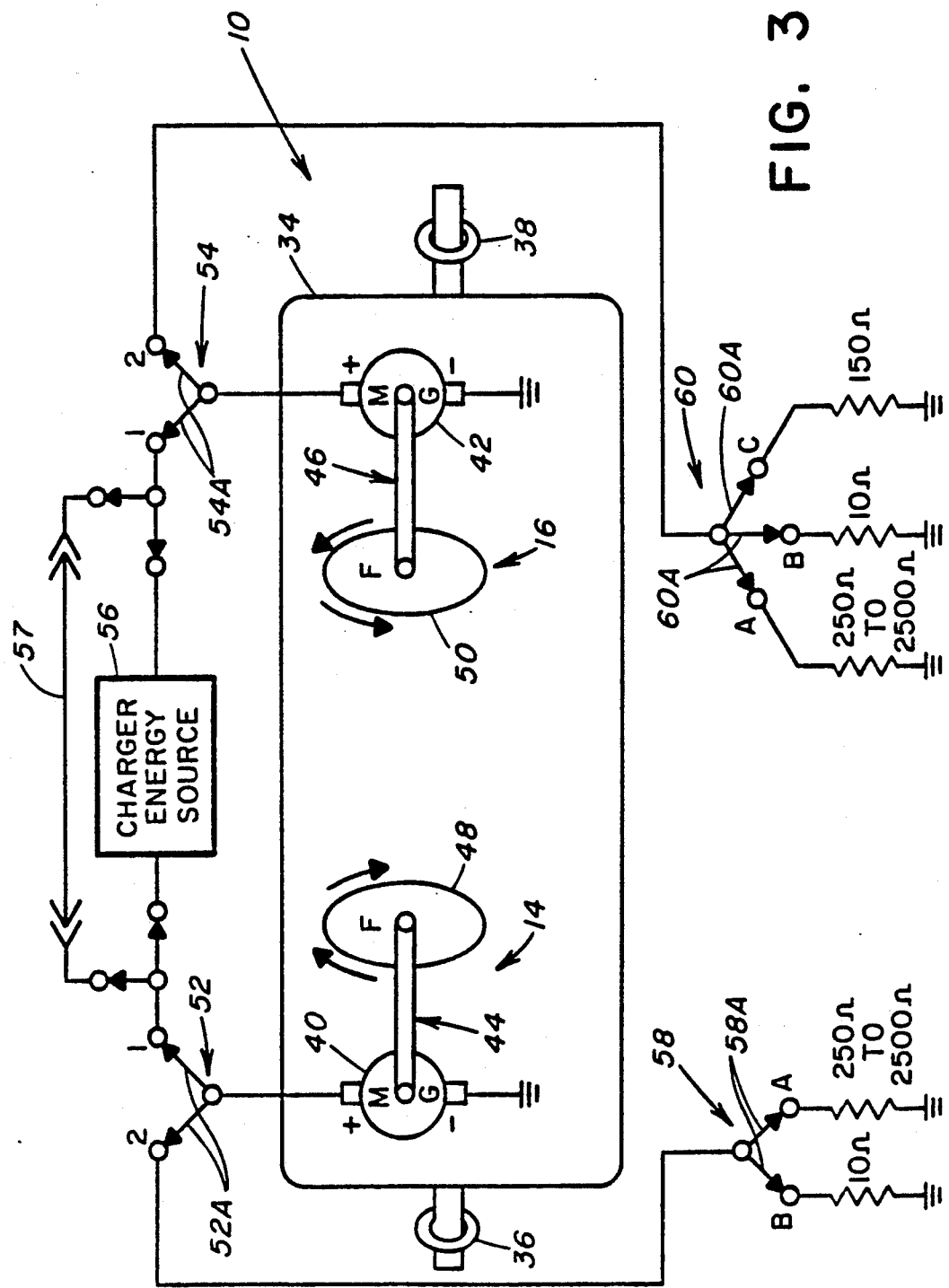
FIG. 3 is a diagram of a demonstration setup to simulate operation of power flow control units and flywheel-motor-generator units employed in the integrated system.

Referring now to the drawings, and particularly to FIG. 1 and FIG. 2, there is shown a general illustration of the present invention disposed within a missile airframe and a detailed diagram of an integrated roll control and power supply system, being generally designated by the numeral 10. As seen in FIG. 1, the integrated system (10) is applied to a smooth body missile (12). The integrated system (10) is preferably located near the center of gravity for the missile (10) or other vehicle. The present invention can easily be applied to other types of air or space vehicles including vehicles having extensions or appendages such as wings, fins, tails, canards, and the like.

Referring to FIG. 2, there is diagrammatically illustrated the basic components of the integrated system

(10) which include a pair of flywheel-motor-generator (FMG) units (14, 16), a pair of power flow control (PFC) units (18, 20) coupled between the FMG units (14, 16) and a missile load (22), such as a movable thrust nozzle of the missile, and a roll sensor (24) coupled to the PFC units (18, 20). Additional components of the integrated system (10) include a pair of resistance heaters (26, 28) and a pair of clutch-brake devices (30, 32).

The FMG units (14, 16) are axially aligned along a common axis L and axially displaced from one another. One FMG unit (14), such as the forward one, operates in a clockwise direction, while the other FMG unit (16) operates in a counterclockwise direction. The two FMG units (14, 16) must be employed to derive the bi-directional roll torque characteristic necessary to develop roll-damping torques for the missile system roll control autopilot.

The roll sensor (24) can be an accelerometer which tracks weapon roll attitude changes or other specific changes that may change the weapon polar moment of inertia. The PFC units (18, 20) receive roll attitude, rate and acceleration input signals from the roll sensor 24. In response to such signals, the PFC units (18, 20) are capable of operating at different levels. At level one, which involves either analog or digital computations, the PFC units (18, 20) dissipate energy from to either one or both of the FMG units (14, 16) to supply power to electrical components of the missile or between the FMG units (14, 16) themselves and thereby develop appropriately balanced roll torques in the missile airframe. At level two, the PFC units (18, 20) switch the power flow, which is supplemental to normal missile power, to resistance heaters (26, 28) or power sinks when needed and in proportion to demand for roll counter torque on the airframe. At level three, the PFC units (18, 20) switch additional power flow into the mechanical or electro-mechanical clutch/brake devices (30, 32) in proportion to the need for roll dampening torque.

Referring to FIG. 3, there is illustrated a demonstration setup to simulate the operation of the PFC units (18, 20) and the FMG units (14, 16) employed in the integrated system (10). The platform (34) mounting the FMG units (14, 16) is mounted in a free rotating mount on bearings (36, 38). Motor-generators (40, 42) of FMG units (14, 16) are drivingly coupled by shaft, gear or pulley and belt trains (44, 46) to flywheels (48, 50) of the FMG units (14, 16). The negative terminals of the motor-generators (40, 42) are connected to ground, while the positive terminals thereof are connected to a pair of first switches (52, 54). In position 1, the movable contacts (52A, 54A) thereof are connected to a twelve volt charger energy source (56), whereas in position 2, the movable contacts (52A, 54A) of the first switches (52, 54) are connected respectively to second and third switches (58, 60). The movable contacts (58A, 60A) of the second and third switches (58, 60) are movable respectively between positions A, B and A, B, C in which they are connected to different load levels.

The following switch functions simulate PFC operating sequences. The load resistances simulate various missile load scenarios. For a charge mode, the movable contacts (52A, 54A) of the first switches (52, 54) are at positions 1. For a discharge mode, the movable contacts (52A, 54A) of the first switches (52, 54) are at positions 2. When a normal balance condition prevails requiring no roll torque to be applied, the movable contacts (58A, 60A) of the second and third switches (58, 60) are at positions A. When an unbalanced condition prevails in which level one roll torque is required to be applied, the movable contacts (58A, 60A) of the second and third switches (58, 60) are respectively at positions A and C. When an unbalanced condition prevails in which level two roll torque is being applied, the movable contacts (58A, 60A) of the second and third switches (58, 60) are respectively at positions A and B, or vice versa.

Figure 4:
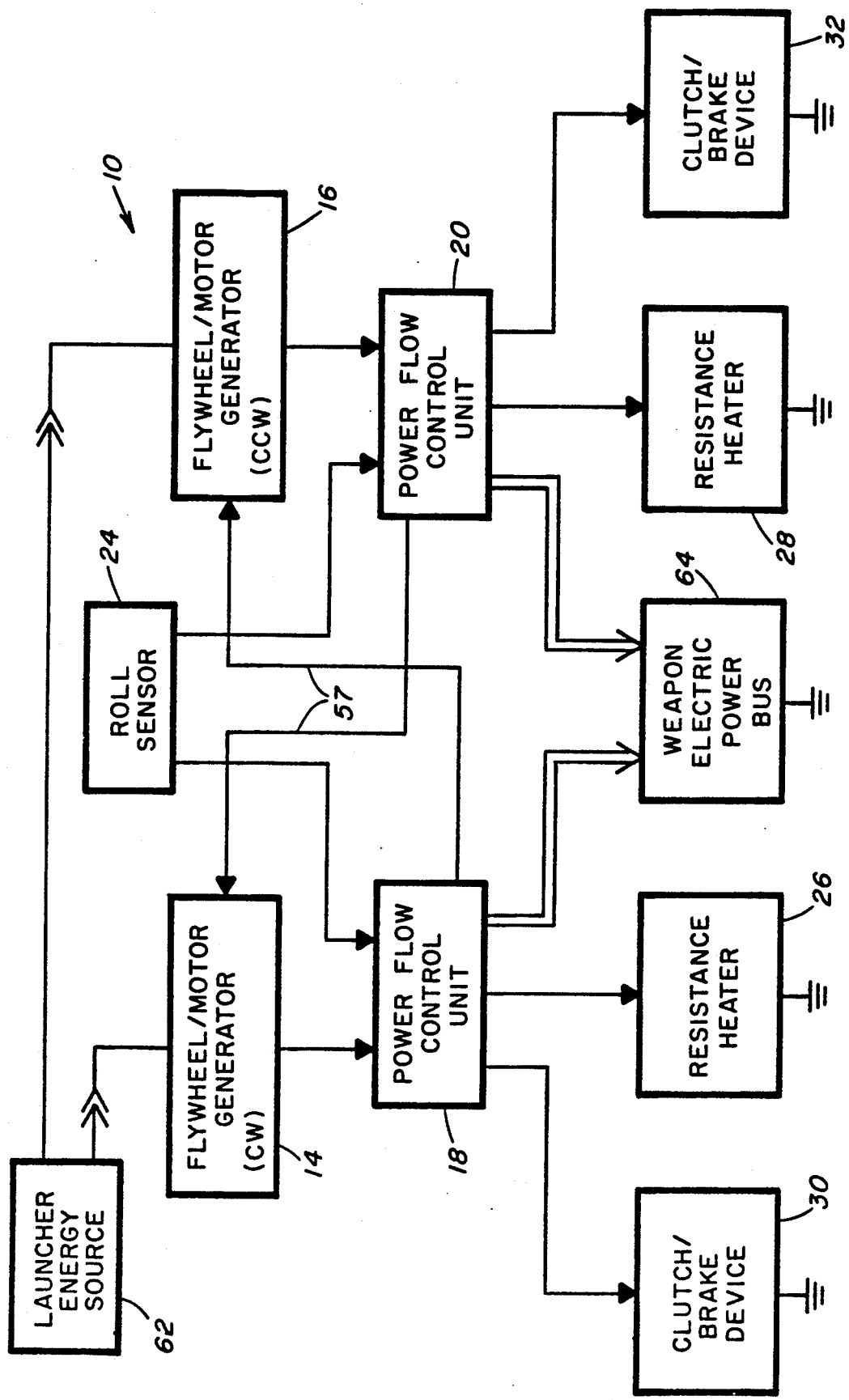
FIG. 4 is a more detailed block diagram of the integrated system.

Referring to FIG. 4, there is illustrated another more detailed block diagram of the integrated system (10) whose components and interconnections are the same as those described above. A launcher energy source or charger (62), which remains with a launcher (not shown) delivers electrical power to both fly wheels of the FMG units (14, 16) via the motors thereof, driving each from stationary or zero energy storage, to an upper rotational speed dictated by mechanical/electrical design reflecting anticipated weapon power needs defined as the upper energy storage limit. Preferably, each flywheel is initially charged to store ½ of the total anticipated mission energy. Thus, launcher energy source (62) is operable to deliver equal amounts of energy to each FMG unit (14, 16) during the charge mode. This means that the flywheels spin in opposite directions and store equal amounts of mechanical energy at launch. It is also operable to verify proper function of all weapon power delivery systems by exercising the system elements and checking their response. This can be an automated process performed periodically as needed. Roll signals must be developed by suitable mean, preferably physical roll accelerations developed on the missile airframe by suitable equipment. The launcher energy source (62) is also operable in a test mode in which it provides appropriate power conditioning.

As explained earlier, two of the FMG units (14, 16) are needed to make the integrated system (10) work. Each unit (14, 16) is sized the same according to its energy storage needs and limitations and physically spaced with respect to one another to minimize unwanted gyroscopic actions associated with missile pitch and yaw maneuvers. Each unit (14, 16) rotates in a direction opposite to the other, one clockwise and the other counterclockwise. Each unit (14, 16) rotates about a common axis of rotation which corresponds to the missile longitudinal center axis L. The axis of rotation corresponds to the axis about which roll moment or torque will be generated in a bi-directional manner. Further, each unit (14, 16) is mounted within a vacuum chamber (15), common to both units to minimize aerodrag parasitic power loss and to ensure minimal corrosion, a 10-year shelf life being desired. Each unit (14, 16) is preferably designed for a 100-hour functional life. The flywheels are connected through electromagnetic induction coupling to the motor/generator devices of the units (14, 16). The flywheel electro-mechanical technologies that can be used include homopolar generator, discrete FMG, integrated FMG with combined flywheel and motor rotor and starter.

The roll sensor (24), which is an integral part of the weapon roll autopilot control system, senses weapon roll accelerations in clockwise and counterclockwise directions and delivers appropriately conditioned signals to each PFC unit (18, 20) for controlling weapon roll damping. When no weapon roll damping is required, these signals indicate that a balance condition exists.

The PFC units (18, 20) are electronic assemblies being operable for handling the intelligence and power flow control aspects of the weapon power system. The PFC units (18, 20) sense roll status via the roll sensor (24) and appropriately deliver electric power to the function level one weapon electric power bus (64) and the balance bus (57), to the function level two resistance heaters (26, 28), and to the level three clutch-brake devices (30, 32), as needed, to dampen and prevent unwanted injection of or externally induced roll torque into the missile airframe. The function level two and three devices are preferably employed only as a last resort. The PFC units (18, 20) deliver conditioned or regulated power to a weapon electric power bus (64) and the balance bus (57) from the electric generators (40, 42) of the respective FMG units (14, 16). The power bus (64) can include multiple voltage and current splits to various components as needed. Thus, the power delivered to the adjacent FMG units (14, 16) are balanced to prevent roll generation except when needed to respond to externally induced roll excursions. The PFC units (18, 20) in concert deliver adequate power to the weapon power bus (64) and differentially adjust power draw from the FMG units (14, 16) to counteract or dampen weapon roll excursions. The balance bus (57) can be used to transfer energy between FMG units (14, 16) to develop roll torques depending on the presence of missile forces, the relative energy between the FMG units (14, 16), and the power demand from the missile.

The resistance heaters (26, 28) are simply designed to dissipate power when called upon by the PFC units (18, 20). They must be capable of dumping power up to the maximum safely deliverable from the weapon energy storage medium without destroying the generator field windings because of too much current flow. In this situation, unwanted winding heating would occur, destroying windings or related power conditioning elements. The PFC units (18, 20) are operable to compute the amount of power sent to these heaters and to sense any unwanted power draw by them. For example, the PFC units (18, 20) sense temperature to aid in the assessment of this situation.

The clutch-brake devices (30, 32) are utilized to dump inertial energy (power) at a sufficiently high level to induce the highest expected transient counteractive airframe torques. These are meant to dampen high transient torques induced on the airframe by the environment. The clutch-brake devices (30, 32) are mechanical devices capable of dissipation of substantial power when interfaced with a suitable brake or hydro-dynamic damping medium. Viscous drag or mechanical friction will dissipate energy.

Roll damping is a torque generated on demand that counteracts sensed external induced roll torque. External roll torque may occur because of: (1) thrust vector control system crosstalk; (2) unmatched or second-order effect actuation devices responsible for deflecting steering elements such as fins, movable nozzles or thrust vector control vanes; and (3) external airframe aerodynamic forces induced by high angle-of-attack turns and associated asymmetrical vortex shedding.

The FMG units (14, 16) generate roll damping torque in response to the following occurrences: (1) natural discharge of stored energy to missile system components, such as actuators, sensors, seekers, etc., through the integral generator device by electromagnetic induction coupling; and (2) flywheel deceleration, which includes rotational or angular deceleration as energy is tapped and converted from inertial energy to electrical energy by load elements of the missile.

As hereinabove explained, three levels of roll damping control can be provided. In level one roll damping, the natural load energy dissipation caused by normal missile component function can be exploited to provide a limited measure of roll damping torque. The bi-directional torque needed in this case is controlled by the PFC units (18, 20) which switch the electrical load from one FMG unit to the other in a proportional manner depending on the sensed need for roll torque to dampen missile roll. For example, to provide limited torque in counterclockwise direction only, the electrical load is switched completely to the clockwise rotating FMG unit (14). On the other hand, to provide limited torque in the clockwise direction only, the electrical load is switched completely to the counterclockwise rotating FMG unit (16). To provide zero torque balance, the electrical load is shared equally between the FMG units (14, 16).

If greater roll damping torque is required then the other levels of roll damping are undertaken. Greater roll damping is typically more than is available from normal load energy dissipation by power supplied to missile components as explained above. In level two roll damping, extra energy is dissipated via the high wattage resistance heaters (26, 28). These loads, which dissipate energy as heat, will dissipate large amounts of power over short time periods to counteract large transient airframe roll excursions. These loads are capable of being placed into the electrical circuit in a proportional manner. This is accomplished by use of power switching components which vary resistance in response to control signals. Alternatively or simultaneously, a portion of the energy can be transferred between FMG units (14, 16) via the balance bus (57) in order to balance the energy between FMG units (14, 16) as well as generate torques.

If still greater roll damping torque is required, which includes situations where greater than that available from levels one and two roll damping as explained above, then the level three roll damping can be undertaken. In level three roll damping, the clutch/brake devices (30, 32) are employed to provide roll damping if the missile transient roll excursions exceed the torque available from the level one and two methods. It is preferred that the clutch/brake devices (30, 32) be magnetically activated since electrical control signals can then be used. The control signals can be made proportional so that the clutching action imposed on the FMG units (14, 16) by the devices (30, 32) can be made proportional. This third level roll damping is a last resort method and indeed its use may turn out not to be necessary or only infrequently used.

While the above description of the present invention is concerned with coupling a pair of FMG units along one particular axis, it is conceivable to utilize multiple integrated systems, as described above, each oriented along a different axis and appropriately connected thereby yielding a tri-axial integrated system.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore

Having thus described the invention, what is claimed is:

1. An integrated roll control and power supply system for a missile, comprising:
   (a) a pair of flywheel-motor-generator (FMG) units being axially aligned with one another and respectively operable in clockwise and counterclockwise directions so as to produce bi-directional roll torque and generate electrical power;
   (b) means for sensing roll accelerations in clockwise and counterclockwise directions in an airframe of a missile and being operable to generate output signals corresponding thereto;
   (c) a pair of power flow control (PFC) units connected to said sensing means and coupled between said FMG units and an electrical load in the missile, said PFC units being operable to receive said output signals from said sensing means and to cause selected dissipation of the roll torque of said FMG units by supplying electrical power from said FMG units to the electrical load in the missile and thereby produce roll-damping torques in the airframe for control of any undesirable roll in the airframe of the missile; and
   (d) a first and second means coupled to the power flow control units for transferring energy directly between the two FMG units.

2. The integrated system of claim 1 wherein said sensing means is an accelerometer.

3. The integrated system of claim 1 further comprising:
   first and second means coupled to said PFC units for receiving electrical power from said PFC units and dissipating said electrical power as heat; and
   first and second means coupled to said PFC units and engagable with said FMG units for receiving electrical power from said PFC units and engaging said FMG units to correspondingly dissipate said roll torque thereof.

4. The integrated system of claim 3 wherein said first and second dissipating means are a pair of resistance heaters.

5. The integrated system of claim 3 wherein said first and second engaging means are a pair of clutch/brake devices.

6. The integrated system of claim 3 wherein said PFC units are operable to cause selected dissipation of the roll torque of said FMG units by also supplying electrical power from said FMG units to said first and second dissipating means and first and second engaging means and thereby produce additional roll-damping torques in the airframe for control of any undesirable roll in the airframe of the missile.

7. An integrated roll control and power supply system for a missile, comprising:
   (a) a pair of flywheel-motor-generator (FMG) units being axially aligned with one another and respectively operable in clockwise and counterclockwise directions so as to produce bi-directional roll torque and generate electrical power;
   (b) means for sensing roll accelerations in clockwise and counterclockwise directions in an airframe of a missile and being operable to generate output signals corresponding thereto;
   (c) a pair of power flow control (PFC) units connected to said roll sensor and coupled between said FMG units and an electrical load in the missile, said PFC units also being coupled between said FMG units and said first and second dissipating means, said PFC units being operable to receive said output signals from said roll sensor and to cause selected dissipation of the roll torque of said FMG units by supplying electrical power from the FMG units to the electrical load in the missile and to said first and second dissipating means and thereby produce roll-damping torques in the airframe for control of any undesirable roll in the airframe of the missile;
   (d) first and second means coupled to said PFC units for receiving electrical power from said PFC units and dissipating said electrical power as heat; and
   (e) a first and second means coupled to the power flow control units for transferring energy directly between the two FMG units.

8. The integrated system of claim 7 wherein said sensing means is an accelerometer.

9. The integrated system of claim 7 wherein said first and second dissipating means are a pair of resistance heaters.

10. An integrated roll control and power supply system for a missile, comprising:
    (a) a pair of flywheel-motor-generator (FMG) units being axially aligned with one another and respectively operable in clockwise and counterclockwise directions so as to produce bi-directional roll torque and generate electrical power;
    (b) a roll sensor for sensing roll accelerations in clockwise and counterclockwise directions in an airframe of a missile and being operable to generate output signals corresponding thereto;
    (c) a pair of power flow control (PFC) units connected to said sensing means and coupled between said FMG units and an electrical load in the missile, said PFC units also being coupled between said FMG units and said first and second engaging means, said PFC units being operable to receive said output signals from said sensing means and to cause selected dissipation of the roll torque of said FMG units by supplying electrical power from the FMG units to the electrical load in the missile and to said first and second engaging means and thereby produce roll-damping torques in the airframe for control of any undesirable roll in the airframe of the missile;
    (d) first and second means coupled to said PFC units and engagable with said FMG units for receiving electrical power from said PFC units and engaging said FMG units to correspondingly dissipate said roll torque thereof; and
    (e) a first and second means coupled to the power flow control units for transferring energy directly between the two FMG units.

11. The integrated system of claim 10 wherein said sensing means is an accelerometer.

12. The integrated system of claim 10 wherein said first and second engaging means are a pair of clutch/brake devices.

13. An integrated roll control and power supply method for a missile, comprising the steps of:
    (a) providing on an airframe of a missile a pair of flywheel-motor-generator (FMG) units being axially aligned with one another and respectively operable in clockwise and counterclockwise directions so as to produce bi-directional roll torque and generate electrical power;

(b) sensing roll accelerations in clockwise and counterclockwise directions in an airframe of a missile and generating output signals corresponding thereto;

(c) in response to said output signals, causing selected dissipation of the roll torque of said FMG units by supplying electrical power from the FMG units to the electrical load in the missile and thereby producing roll-damping torques in the airframe for control of any undesirable roll in the airframe of the missile; and (d) in response to said output signals, transferring electrical power as needed from one FMG unit to the other FMG unit.

14. The integrated method of claim 13 further comprising the step of:

in response to said output signals, causing selected dissipation of the roll torque of said FMG units by also supplying electrical power from said FMG units to a pair of resistance heaters to correspondingly dissipate the electrical power as heat.

15. The integrated method of claim 13 further comprising the step of:

in response to said output signals, causing selected dissipation of the roll torque of said FMG units by also supplying electrical power from said FMG units to clutch/brake devices to cause corresponding braking engagement thereof with said FMG units.

16. The integrated method of claim 15 further comprising the step of:

in response to said output signals, causing selected dissipation of the roll torque of said FMG units by also supplying electrical power from said FMG units to a pair of resistance heaters to correspondingly dissipate the electrical power as heat.

* * * * *